Oct. 24, 1939.   W. A. GIBBONS ET AL   2,177,062
PLATE FOR ELECTRICAL ACCUMULATORS OR STORAGE BATTERIES
AND PROCESS OF MAKING THE SAME
Filed June 4, 1936
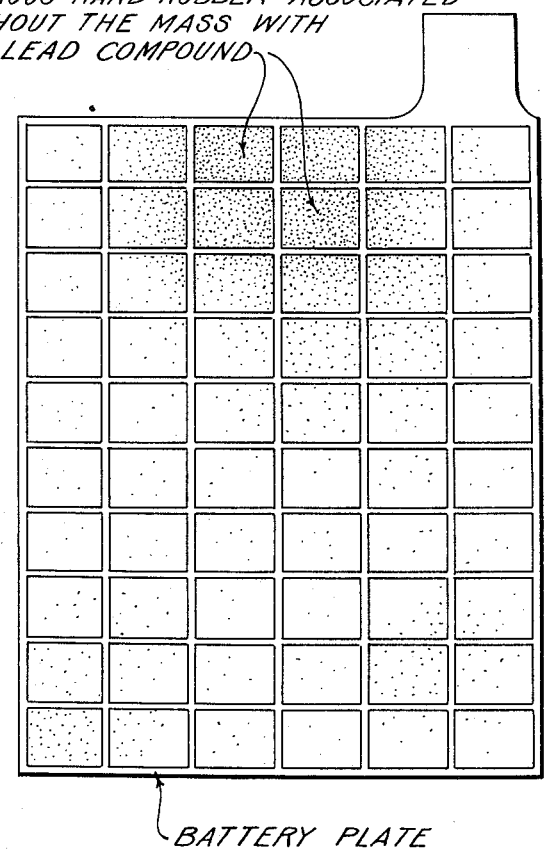
POROUS MASS COMPRISING VULCANIZED
MICROPOROUS HARD RUBBER ASSOCIATED
THROUGHOUT THE MASS WITH
ACTIVE LEAD COMPOUND
BATTERY PLATE
INVENTORS
WILLIS A. GIBBONS
EARDLEY HAZELL
BY Gourley & Budlong
ATTORNEYS Patented Oct. 24, 1939

2,177,062

UNITED STATES PATENT OFFICE 2,177,062

PLATE FOR ELECTRICAL ACCUMULATORS OR STORAGE BATTERIES AND PROCESS OF MAKING THE SAME

Willis A. Gibbons, Montclair, N. J., and Eardley Hazell, New York, N. Y., assignors, by mesne assignments, to United States Rubber Company, New York, N. Y., a corporation of New Jersey Application June 4, 1936, Serial No. 83,502
In Great Britain December 11, 1935

8 Claims. (Cl. 136—26)

This invention relates to improvements in the production of plates for electrical accumulators or storage batteries.

Plates as made hitherto comprise a grid or framework, having open spaces filled with a paste of litharge and water. Other materials may be added to modify the consistency of the paste or the cohesiveness of the dry material.

As such plates are charged and discharged the lead compounds in the openings of the grid tend to disintegrate and drop down. This is particularly true in the case of the positive plates. Various mechanical methods have been adopted in order to prevent this—for example, the plates have been surrounded with tubes or sheets of slotted or perforated ebonite.

The present invention aims at providing a new and improved method of preparing a plate whereby to avoid such disintegration.

Another object of the invention is to provide a plate in which such as the litharge or other electrolytically responsive material is so disposed as to present a greater area of active material. Other objects will be apparent from the following description:

The single figure of the drawing represents diagrammatically a storage battery plate made in accordance with the invention.

According to one embodiment of the invention, crude rubber is broken down or softened on a mill in the usual way and mixed with litharge in order to secure the best results. As large an amount of litharge is used as possible without affecting adversely the workability of the material or the properties of the finished product; vulcanizing ingredients such as sulphur and accelerators or chemical compounds capable of effecting vulcanization such as nitrobenzenes, thiuram disulphides or tetra-chloro-quinone may be added. Agents may also be added whose function is to produce in the finished product a porous or open structure.

These agents may be materials such as bicarbonate of sodium or ammonium which will evolve gas on heating, or materials such as colloidal clay which will absorb water and later evolve water in the form of vapor when heated.

Or, alternatively, materials may be added which are inherently porous, such as infusorial earth or preferably porous finely divided ebonite dust.

The mass thus mixed in the above manner is forced into the open spaces or interstices of a lead alloy grid of the form usually employed for the manufacture of storage batteries.

The substantially homogeneous rubber mixture may be forced into the grid spaces by placing the mixture on a calender of the usual form and passing the grid through the spaces between the rolls of the calender as the rubber compound in sheet form passes around one of these rolls. Alternatively, the rubber mixture may be extruded or otherwise pressed into the open spaces.

The plate prepared in this way is vulcanised in any desired manner—for example, by exposure to steam for the desired time and at the desired temperature. If it is intended to make a sheet in which the binder is to be converted into hard rubber, or ebonite, there is added a sufficient quantity of sulphur—say 50 parts per each 100 parts of rubber, by weight, during the mixing operation and the vulcanisation is carried out for a period of say three hours at a pressure of 60 lbs./sq. in. steam pressure.

On the other hand, if a soft rubber binder is desired, a smaller quantity of sulphur and a shorter time for vulcanization is used.

Likewise, if vulcanizing agents other than sulphur are desired, time and temperature may be adjusted according to the peculiar characteristics of such vulcanizing agents.

If the rubber compound is of the type in which colloidal clay is used, it will be desirable in many cases to subject the plate to a soaking operation before vulcanization. While conditions will vary, a soaking for a period of three hours at the boiling point of water, may be taken as an example.

In other cases, it may be desirable to soak the plate embodying the colloidal clay-rubber mixture for about three hours in water at or near the boiling point before vulcanization, and cure under water to develop porosity in the rubber.

Depending on the methods and conditions used to produce the open or porous structure, it will be desirable to level off, as by grinding, the surface of the vulcanized plate, or alternatively, where swelling takes place during cure, to fill the plate with a pre-determined quantity of the unvulcanized massive material, such quantity being less than the actual volume enclosed by the grid. During the swelling and vulcanizing operation, the mass will expand to fill the grid.

The above methods are outlined merely by way of example. In place of crude rubber, reclaims or synthetic rubber may be used, or latex, or, in place of any form of rubber, any other similar settable plastic may be used.

Where finely divided highly microporous hard rubber powder is used, it is preferably of at least 200 mesh. It may be mixed with the paste of such as the lead oxide, with the aid of any suitable liquid, such as dilute sulphuric acid. The finely divided hard rubber may be dry, or in the form of a sludge or suspension. In some cases it may be desirable to form and deposit the active material such as lead oxide on the finely divided rubber particles to coat them, before setting and compressing the mix. The proportion of finely divided microporous hard rubber to active material, may be varied to suit the requirements of each individual case, and according to whether the rubber material is to be used predominantly as an expander or porosity agent. If desired, an additional binder may be added to the mix, for example latex, or a dispersion or emulsion of a synthetic resin such as Bakelite, Duprene (polymerized chloroprene), or polymerized vinyl compound such as polymerized styrol. The mix may be forced or pressed, as aforesaid, in any suitable manner into the open spaces or interstices of the grid.

A plate formed as indicated is adapted to withstand the action of battery acid and resist oxidation. Furthermore the final active material is restrained from crumbling from the plate, while providing free access of acid to the active material.

It is to be understood that the finely divided microporous rubber particles may be mixed with active materials other than lead oxide depending on the type of active material suitable to the particular storage battery or accumulator before application to the plate or grid and before drying.

Having thus described our invention, what we claim and desire to protect by Letters Patent is:

1. A process of making an improved electrical accumulator plate which comprises filling the spaces of the grid framework with a mix comprising finely divided electrolytically-responsive material, a rubber composition containing vulcanizing ingredients and a hydrous inorganic colloidal material, and vulcanizing the rubber under non-evaporative conditions.

2. A process of making an improved electrical accumulator plate which comprises filling the spaces of the grid framework with a mix comprising finely divided electrolytically-responsive material, a rubber composition containing vulcanizing ingredients, and a colloidal clay, and after imbuing the mass with water vulcanizing the rubber under non-evaporative conditions.

3. A grid plate for electric storage batteries having its spaces or interstices filled by a porous mass comprising vulcanized microporous rubber associated throughout the mass with the electrolytically-responsive material of the plate.

4. A grid plate for electric storage batteries having its spaces or interstices filled by a porous mass comprising vulcanized microporous hard rubber associated throughout the mass with the electrolytically-responsive material of the plate.

5. An electrode for storage batteries and the like, wherein the active material of the electrode is associated with finely divided microporous rubber particles as a porosity agent.

6. An electric battery plate or electrode for storage batteries and the like, comprising a compact mixture containing finely divided active material of the electrode associated with finely divided highly microporous hard rubber as a porosity agent.

7. An electric battery plate composition comprising a paste of finely divided active material for the plate associated with finely divided highly microporous hard rubber as a porosity agent.

8. An electrical accumulator plate consisting in the uncharged condition of a lead or equivalent form of grid, the spaces of which are filled with a lead compound, forming the active material, the particles of which compound are held together by a binder plastic comprising finely divided microporous hard rubber as a porosity agent.

WILLIS A. GIBBONS.
EARDLEY HAZELL.